(12) United States Patent
Jackson et al.

(10) Patent No.: US 9,971,830 B2
(45) Date of Patent: May 15, 2018

(54) RECOMMENDING USERS TO ADD TO GROUPS IN A SOCIAL NETWORKING SYSTEM

(75) Inventors: Todd Christopher Jackson, San Francisco, CA (US); William Russell Maschmeyer, San Francisco, CA (US); Bin Jiang, San Francisco, CA (US); Kenneth M. Lau, Campbell, CA (US); Michael Novati, Menlo Park, CA (US)

(73) Assignee: Facebook, Inc., Menlo Park, CA (US)

( * ) Notice: Subject to any disclaimer, the term of this patent is extended or adjusted under 35 U.S.C. 154(b) by 399 days.

(21) Appl. No.: 13/605,999

(22) Filed: Sep. 6, 2012

(65) Prior Publication Data

US 2014/0067826 A1 Mar. 6, 2014

(51) Int. Cl.
*G06F 17/30* (2006.01)
*G06Q 50/00* (2012.01)

(52) U.S. Cl.
CPC .. *G06F 17/30699* (2013.01); *G06F 17/30702* (2013.01); *G06F 17/30867* (2013.01); *G06Q 50/01* (2013.01)

(58) Field of Classification Search
None
See application file for complete search history.

(56) References Cited

U.S. PATENT DOCUMENTS

| | | | |
|---|---|---|---|
| 7,680,770 B1 * | 3/2010 | Buyukkokten et al. | 707/758 |
| 8,005,909 B2 * | 8/2011 | Raman | 709/206 |
| 8,095,432 B1 | 1/2012 | Berman et al. | |
| 8,478,697 B2 | 7/2013 | Agarwal | |
| 8,538,810 B2 | 9/2013 | Fox | |
| 8,615,434 B2 | 12/2013 | Benyamin et al. | |
| 8,639,603 B2 | 1/2014 | Denning et al. | |
| 8,719,347 B1 | 5/2014 | Tomkins et al. | |
| 8,856,235 B2 | 10/2014 | Zhou et al. | |
| 9,158,775 B1 * | 10/2015 | Tomkins | G06F 17/30041 |
| 9,524,487 B1 * | 12/2016 | Yagnik | G06Q 30/00 |
| 2005/0198172 A1 | 9/2005 | Appleman et al. | |
| 2006/0059260 A1 | 3/2006 | Kelly et al. | |
| 2007/0099701 A1 | 5/2007 | Simon et al. | |

(Continued)

OTHER PUBLICATIONS

U.S. Appl. No. 13/606,001, filed Sep. 6, 2012 (copy not enclosed).

(Continued)

*Primary Examiner* — Farhan Syed
(74) *Attorney, Agent, or Firm* — Fenwick & West LLP

(57) ABSTRACT

Based on information associated with users, a social networking system recommends one or more groups for a target user to join or to create. Characteristics of the target user, characteristics of users connected to the target user, characteristics of candidate groups in the social networking system may be used to identify groups for recommendation. The social networking system may provide questions to the target user and recommend a group to the target user based on received answers to the questions. For example, the answers to the provided question identify one or more characteristics of the target user, which are used to select a group for recommendation. Additionally, the social networking system may recommend additional users for the target user to add or invite to a group based on characteristics of the target user, the additional users, and/or the group.

15 Claims, 6 Drawing Sheets

(56) References Cited

U.S. PATENT DOCUMENTS

| | | | |
|---|---|---|---|
| 2007/0192299 A1* | 8/2007 | Zuckerberg | G06Q 10/10 |
| 2008/0119277 A1 | 5/2008 | Thelen | |
| 2009/0030932 A1* | 1/2009 | Harik | G06Q 10/10 |
| 2009/0049036 A1* | 2/2009 | Juan et al. | 707/5 |
| 2009/0106040 A1 | 4/2009 | Jones | |
| 2009/0119167 A1* | 5/2009 | Kendall | G06Q 30/02 705/14.17 |
| 2010/0017261 A1 | 1/2010 | Evans et al. | |
| 2010/0042511 A1 | 2/2010 | Sundaresan et al. | |
| 2011/0131077 A1* | 6/2011 | Tan | G06Q 30/02 705/7.29 |
| 2011/0137789 A1* | 6/2011 | Kortina | G06Q 20/405 705/38 |
| 2012/0036523 A1 | 2/2012 | Weintraub et al. | |
| 2012/0041907 A1 | 2/2012 | Wang et al. | |
| 2012/0117144 A1 | 5/2012 | Douillet et al. | |
| 2012/0117167 A1 | 5/2012 | Sadja et al. | |
| 2012/0164606 A1* | 6/2012 | Moon et al. | 434/156 |
| 2012/0166532 A1* | 6/2012 | Juan | G06Q 30/0224 709/204 |
| 2012/0185779 A1 | 7/2012 | Dugan et al. | |
| 2012/0203846 A1 | 8/2012 | Hull et al. | |
| 2012/0246244 A1 | 9/2012 | Mallet et al. | |
| 2012/0310926 A1 | 12/2012 | Gannu et al. | |
| 2012/0331063 A1* | 12/2012 | Rajaram | G06Q 10/10 709/206 |
| 2012/0331064 A1 | 12/2012 | Deeter et al. | |
| 2013/0013541 A1 | 1/2013 | Juan et al. | |
| 2013/0027428 A1 | 1/2013 | Graham et al. | |
| 2013/0124322 A1 | 5/2013 | Boland et al. | |
| 2013/0254283 A1* | 9/2013 | Garcia-Martinez | G06Q 50/01 709/204 |
| 2013/0254309 A1 | 9/2013 | Jackson et al. | |
| 2013/0275417 A1 | 10/2013 | Fernandes | |
| 2013/0290414 A1 | 10/2013 | Rait et al. | |
| 2013/0290820 A1* | 10/2013 | Dhanani | 715/205 |
| 2013/0304685 A1* | 11/2013 | Kurata | G01C 21/20 706/45 |
| 2014/0012918 A1 | 1/2014 | Chin et al. | |
| 2014/0046976 A1* | 2/2014 | Zhang | G06F 17/30483 707/772 |
| 2014/0047023 A1* | 2/2014 | Baldwin | G06Q 10/10 709/204 |
| 2014/0052718 A1* | 2/2014 | Waupotitsch | G06F 17/30867 707/728 |
| 2014/0067817 A1 | 3/2014 | Seth et al. | |
| 2014/0089084 A1 | 3/2014 | Benyamin et al. | |
| 2014/0122294 A1 | 5/2014 | Chen et al. | |
| 2014/0214951 A1 | 7/2014 | Mallet et al. | |
| 2014/0279667 A1 | 9/2014 | Gillen | |
| 2015/0256503 A1* | 9/2015 | Baldwin | G06Q 10/10 709/204 |

OTHER PUBLICATIONS

U.S. Appl. No. 13/606,000, filed Sep. 6, 2012 (copy not enclosed).
U.S. Appl. No. 13/605,998, filed Sep. 6, 2012 (copy not enclosed).
U.S. Appl. No. 13/589,693, filed Aug. 20, 2012 (copy not enclosed).
U.S. Appl. No. 13/239,340, filed Sep. 21, 2011 (copy not enclosed).

* cited by examiner

RECOMMENDING USERS TO ADD TO GROUPS IN A SOCIAL NETWORKING SYSTEM

BACKGROUND

This invention relates generally to social networking and, in particular, to recommending groups for a target user to join or create, and to recommending other users for the target user to add to a group.

Automatically organizing social networking system users into groups of associated users can be an inefficient process subject to mistakes. Social networking systems may have up to hundreds of millions of users or more, so selecting the most relevant groups for each user is a resource-intensive process. Large numbers of social networking system users also make the manual organization of groups by the user a time-consuming process, and may result in the user failing to identify the groups most relevant to the user. Thus, the time needed by users to manually identify relevant groups makes it likely that certain users do not join groups that they otherwise would join. Further, requiring manual group selection may discourage a user from creating a new group because of the time involved in adding users to a created group. Simplifying the identification of groups for users to join, the identification of users to add to groups and the creation of groups allows social networking system users to better identify groups of other users with similar interests, improving overall user interaction with the social networking system.

SUMMARY

A social networking system provides group recommendations to its users. For example, the social networking system provides a target user with a recommendation of a group to join. The target user may explicitly request a recommendation of a group to join or may access a portion of the social networking system associated with group recommendations. To recommend a group to the target user, a set of users connected to the target user is first identified. The set of users connected to the target user can be users that have explicitly established a connection with the target user within the context of the social networking system, or can be users having one or more characteristics in common with the target user.

Based on the set of users connected to the target user, a set of candidate groups for recommendation is identified from a plurality of groups stored at the social networking system. In one embodiment, the set of candidate groups includes at least a set of groups having users from the identified set of users connected to the target user as members. A candidate group is selected from among the set of candidate groups based on one or more of: the characteristics of the users in the set of users connected to the target user, the characteristics of the target user, and the characteristics of the set of candidate groups. For example, a candidate group is selected based on the level of activity of users within the candidate group and based on the strength of the connection between the target user and various users within the candidate group. The selected candidate group is presented to the target user to allow the target user to easily join the selected candidate group. For example, the selected candidate group is displayed to the target user using a group recommendation interface. Alternatively, the social networking system may automatically add or invite the target user to the selected candidate group.

In one embodiment, a group is selected from the candidate groups based on candidate scores computed for each candidate group. Candidate scores may be based on a level of activity of users in a candidate group, on affinities between the target user and the users in a candidate group and/or any other characteristic associated with the target user, with users in a candidate group, and/or with a candidate group. Additional factors may be used to modify candidate scores. Example factors include: the size of candidate groups, characteristics common to the target user and a candidate group, characteristics common to the target user and users within a candidate group, whether associated candidate groups are open or closed, based on the size of the candidate groups, or any other suitable criteria.

In addition to recommending one or more groups for a user to join, the social networking system may also simplify group creation by identifying additional users to a user creating a group. For example, a user may create a group and the social networking system identifies users to add to the group. A user, such as a user creating or administering a group, selects a target group. For example, the user is included in the target group or created the target group. A set of candidate users is identified by the social networking system and characteristics of the candidate users are identified. For example, the set of candidate users includes users connected to the user selecting the target group and/or users having one or more characteristics in common with the user selecting the target group.

Based on the characteristics of the candidate users, a candidate user is selected to recommend for addition to the target group. For example, the selected candidate user is the candidate user having the most common connections with the user selecting the target group or is the candidate user connected to the highest number of users in the target group. Alternatively, a user score is generated for each of the candidate users based on characteristics of a candidate user, the user selecting the target group and/or the target group. One or more candidate user is selected based on the user scores. For example, a user score for a candidate user is based on one or more of: the affinity between the candidate user and the user selecting the target group, the likelihood of the candidate user joining the target group if invited, the likelihood of the user selecting the target group inviting the candidate user if suggested or any other suitable factor. One or more candidate users are selected and displayed to the user selecting the target group, allowing the selected candidate users to be invited to the to the target group. Alternatively, selected candidate users may be automatically invited to or added to the target group.

The social networking system may also suggest a group for creating by identifying one or more characteristics common to multiple users, simplifying the creation of a group including users having a common characteristic. A creating user may be a user that requests a recommendation of a group to create, or may be otherwise identified by the social networking system. A set of users associated with the creating user is identified. For example, the set of users includes users connected to the creating user or having one or more characteristics in common with the creating user.

A characteristic common to the target user (a "common characteristic") and to one or more users in the set of users is selected. In one embodiment, the common characteristic is a characteristic shared by the creating user and the highest number of users in the set of users, a highest priority characteristic shared by the creating user and one or more users in the set of users, or a characteristic shared by the creating user and users in the set of users having the highest affinities with the creating user. Examples of a common characteristic include a geographic characteristic, a biographic characteristic, an interest, a hobby, a political viewpoint, a religious viewpoint, a philosophy, or any other suitable information included in user profiles.

A group associated with the selected common characteristic is recommended to the creating user. In one embodiment, a recommendation for the group includes a title for the recommended group based on the selected common characteristic and one or more users from the set of users having the selected common characteristic. Alternatively, the recommendation for the group identifies the selected common characteristic, allowing the creating user to identify users to include in the recommended group, such as using a customization interface. In another embodiment, the recommended group is automatically created and associated with a title based on the selected common characteristic.

To more accurately recommend a group for a target user to join, the social networking system may present one or more questions to the target user and determine a recommended group based on answers to the questions received from the target user. The questions may be selected to identify particular characteristics associated with the target user. Examples of characteristics identified by the questions include: geographic characteristics, biographic characteristics, hobbies, interests, political viewpoints, religious viewpoints, philosophies, or other suitable characteristics. In one embodiment, the questions presented to the target user are selected by the social networking system based on one or more of: the context of the target user within the social networking system, characteristics associated with the target user, one or more other groups in the social networking system including the target user, characteristics of other users connected to the target user, or similar information.

The target user may provide answers to the questions using any suitable interface. For example, predefined answers are presented to the target user along with a question, allowing the target user to select an answer from the predefined answers. Predefined answers may be associated with particular groups or with particular subject matter associated with groups. As another example, the target user enters text to provide an answer to a presented question. Candidate groups are identified based on the received answers. For example, answer text is compared to keywords associated with stored groups and groups associated with one or more keywords matching answer text are identified as candidate groups. From the candidate groups, a group is selected for recommendation to the target user and the selected group is presented to the target user. A group may be selected based on one or more of: the size of the group, the date the group was created, the number of users connected to the target user included in the group, one or more characteristics of the group, one or more characteristics of the target user, affinities between the target user and users in the group, an affinity between the target user and the group or any suitable criteria. In one embodiment, if a stored group is not associated with the received answers, the social networking system recommends that the target user create a group associated with the received answers. While the target user may be automatically added to the selected group, the selected group may instead be identified to the target user, allowing the target user to join the group.

Figure 1:
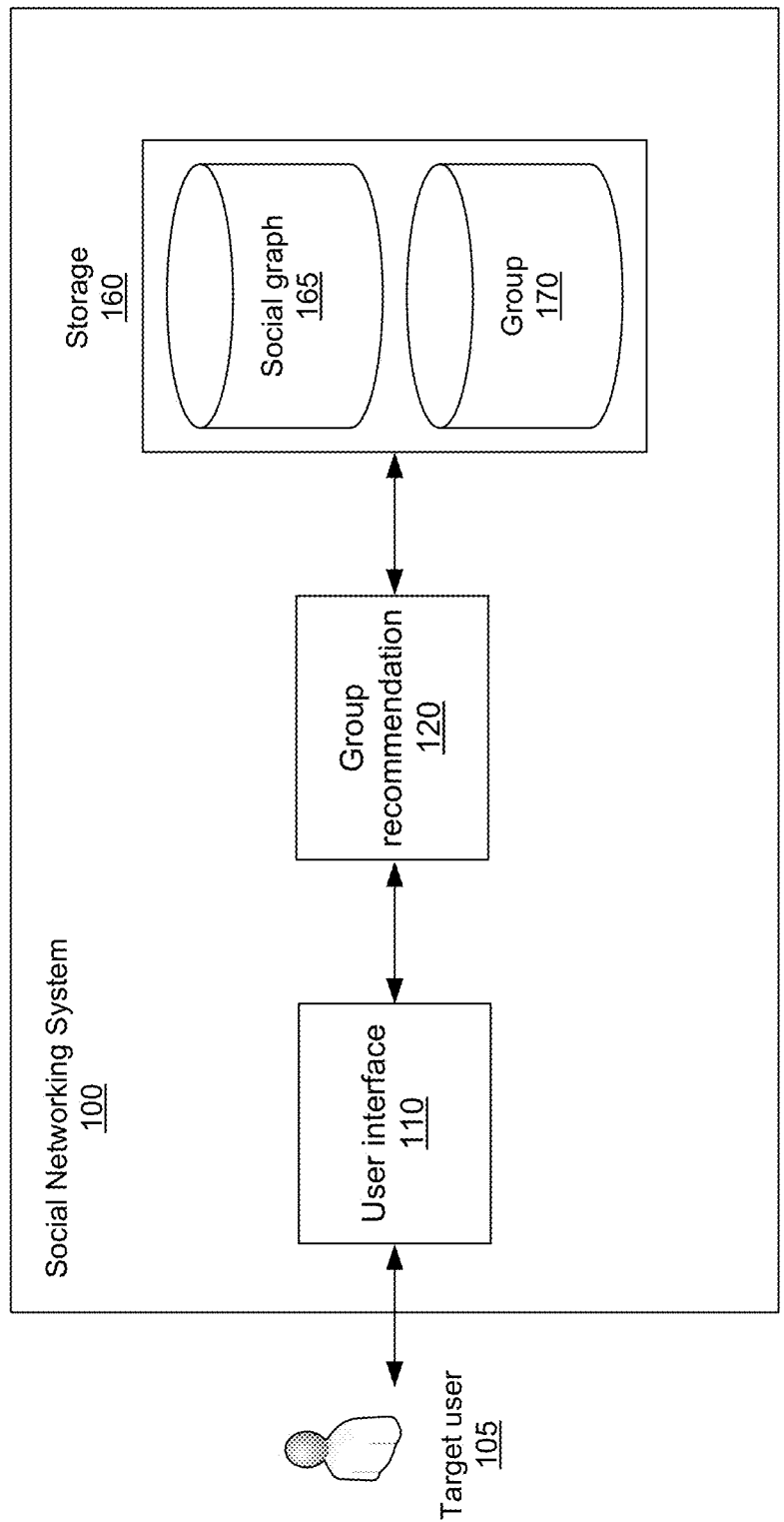
FIG. 1 is a high-level block diagram illustrating the recommendation of groups for a social networking system user to join, to create, or to add other users, in accordance with an embodiment of the invention.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

A social networking system offers its users the ability to communicate and interact with other users of the social networking system. Users join the social networking system and add connections to a number of other users to whom they desire to be connected. Connected users are said to be "friends" in the context of the social networking system. A social networking systems comprises a series of interconnected pages, which may be displayed in a web browser or native application on a client device. Users of a social networking system can provide information describing themselves, which is stored in user profiles. Content from a user profile may be displayed in an associated profile page. For example, a user can provide information about its age, gender, geographical location, education history, employment history, hobbies, interests, favorite movies, favorite music, favorite books, religious views, political views, and other similar descriptive information. Information may be directed to the user by the social networking system based on the information provided by the user. For example, the social networking system may recommend articles, events, and potential friends to a user based on the user's user profile. Collectively, information associated with the user (such as information entered by the user), actions taken by the user, users connected with the user, groups joined by the user, and the like are referred to herein as "characteristics" of the user.

Information tracked and maintained by a social networking system is used to create a social graph, which includes a plurality of nodes that are interconnected by a plurality of edges (representing interactions, connections, communications or other measures of relatedness between nodes). A social graph node may represent a social networking system object that may act on and/or be acted upon by another object having a corresponding node. An edge between nodes in a social graph represents any kind of connection or interaction between the two nodes, which may result from an action that was performed by one of the nodes on the other node. For example, two users connected in a social networking system may each be represented by nodes in the social graph, with an edge connecting the nodes representing the connection between the users. Likewise, a user may "check-in" to a physical location, such as a sports bar, using a device with location-detection functionality (such as a mobile phone with GPS functionality), and the user and sports bar are each represented by nodes in the social graph that are connected by an edge representing the user's "check-in" to the sports bar.

The edges in the social graph may be organized into various categories. For example, one subset of edges represents established connections between users, another subset represents users indicating a preference for a social networking system object ("liking" the object), an additional subset represents "checking in" to a particular location by a user, and so forth. Subsets of edges may be broken down into further subsets of edges as well. For example, the subset of edges representing established connections between users is broken into a subset of edges representing family connections between users, a subset of edges representing friend connections between users, a subset of edges representing co-worker connections between users, and the like.

Edges in the social graph may be associated with affinity scores representing the importance, strength, or relevance of connections between objects. The affinity scores may be referred to as "affinities" or "coefficients." The affinity associated with an edge may be represented in any suitable format such as numeric weights, non-numeric weights (high, medium, low, etc.), Boolean weights, and the like. In one embodiment, different types of edges are associated with an affinity representing the relevance of a node to an additional node connected to the node. For example, family relationships between users may be more relevant than co-worker relationships between users; accordingly, edges representing family connections may be associated with a higher weight than edges representing co-worker connections. As another example, edges representing a user joining a group may have a higher affinity than edges representing the posting of a message to the group's wall by a user not included in the group if joining a group is determined to be more relevant than the posting of a message to the group's wall by a user not included in the group.

Affinities between objects may be used to infer the relevance of an object's characteristics to another object. For example, if a first user (represented by a first node) is connected to a second user (represented by a second node) with an edge associated with a high affinity and is also connected to a third user (represented by a third node) with an edge associated with a lower affinity, an action taken by the second user may be inferred to be more relevant to the first user than an action taken by the third user. Nodes may be connected by multiple edges. For example two users may be connected by an edge representing a familial relationship, an edge representing a tagging of a user in a photograph by the other user, another edge representing a message from a user to the other user, and so forth. If multiple edges connect two nodes, a combination of the affinities associated with each node may be used to infer the relevance of one node to the other. For example, the average, weighted average, sum, weighted sum, or other combination of the affinities associated with the edges may be used to make inferences about the relevance of the characteristics of nodes connected to each other by multiple edges. For simplicity, discussion of inferring relevance between nodes herein refers to a single affinity associated with an edge between nodes, although this single affinity may represent the combination of multiple affinities associated with multiple edges between nodes.

Affinities can be based on the number or type of interactions between two nodes, can be based on the amount of characteristics in common between two nodes, can be based on a common node to which each of two nodes is connected, and can be based on any other suitable factor. Affinities can be determined as described in U.S. patent application Ser. No. 12/978,265, titled "Contextually Relevant Affinity Prediction in a Social Networking System," filed Dec. 23, 2010, the contents of which are incorporated herein by reference in their entirety.

Information stored in the social graph may be queried to identify associated sets of information. For example, a root node in the social graph is identified and nodes connected to the rood node are identified (e.g., all nodes connected to the root node, a subset of nodes connected to the root node, one or more individual nodes connected to the root node, etc.). A particular node is connected to the root node if an edge connects the particular node to the root node. As an example of a query to the social graph, a particular user is identified as the root node, edges connecting to the root node are identified, and nodes connected to the identified edges are identified. Continuing with this example, to identify users connected to the user associated with the root node, only the nodes connected to the root nodes by edges representing connections between users are identified. In one embodiment, the social graph can be queried using two nodes to determine if an edge connects the nodes.

A social networking system allows its users to form groups, which include one or more users and are associated with particular subject matter or characteristic. Users included in a group are referred to as "members" of the group or "group members." In many embodiments, the subject matter associated with a group is an interest, association, characteristic, or affiliation common to members of the group. Examples of subject matter associated with a group include biographic or geographic information common to group members (for instance, a common workplace, school, class year, current location, hometown, and the like); a hobby, an interest (a favorite sport or sports' team, an activity, celebrity, and the like), an art, an artist, an entertainment format (a movie, actor, band, music, music genre, book, author, video game, board game, and the like), a political view, a religious view, a philosophy, a concept, or any other suitable characteristic common to a plurality of users. The subject matter of the group, the communications within the group, the members of the group, and the like are referred to herein as "characteristics" of the group.

To aid users in identifying groups and/or to obtain information about users, the social networking system may present questions to users and store the answers received from users. The social networking system or users of the social networking system may identify the questions presented to other users. For example, a question interface displays a question and one or more selectable answers and/or provides an input that allows a user to create a text answer. Information about a question may also be presented. Examples of information about a question include: the percentage or number of answering users that have selected each answer, the identity of the questioning or any answering user, and the like. Questions may be presented in a sequence dependent on the received answers so that an answer to a question is used to select a subsequent question. For example, a user may answer the question "Where do you go to school?" with the answer "Stanford University," so the social networking system subsequently asks "What major are you?"

Pairs of questions and answers may be associated with a particular subject matter or a particular group. In one embodiment, a user can associate a question or answer with a particular subject matter using a tag or data field associated with the question or answer. In the social graph, a node represents the question and additional nodes represent each answer. The nodes representing the question and one or more nodes representing answers to the question may be connected to nodes representing one or more of: the questioning user, any answering user, subject matter associated with the question or an answer, a group associated with the question or an answer, and the like.

A social networking system user may explicitly join a group or may be automatically added to a group based on information provided by the user to the social networking system. Groups can be "open," allowing anyone to join, or "closed," requiring a user to request to join or be invited by an existing group member to join. Hence, a user is unable to join a "closed" group until addition of the user to the group is approved, for instance by a group manager, and/or the user provides credentials (such as an email address from a particular domain, a password, or the like). A group may have a dedicated page in the social networking system serving as an information hub for group members to access one or more of: information about the group, group events, a group calendar, group photos, other group members, group documents, and any other group features. In some instances, all or part of the information accessible via the group page is visible only to members of the group.

A group page may provide one or more interfaces for group members to communicate with each other. For example, a group page includes a message board or wall allowing group members to post messages viewable by all or a subset of the group members. A group page may also have an instant messaging, video messaging, or email messaging interface allowing group members to communicate. In one embodiment, a group is associated with an email address that forwards received emails to group members, acting as a mailing list for communicating with group members.

A social networking system may allow any user to create a group. In one embodiment, a user provides information for creating a group using a specified form. Social networking system users may add other users to a group. Users may opt out of a group to which they are added, or may require that they approve of any group to which they are added by other users prior to being added to the group. In one embodiment, if a user opts out of a group, the social networking system prevents other users from re-adding the user to the group without pre-approval from the user.

Groups may be organized hierarchically by the social networking system. For example, one group is a top-level group representing an entity (for instance, a group representing the University of Utah), a first set of sub-groups represents various departments of the entity (for the University of Utah example, a first sub-group can represent sports, a second sub-group can represents academics, a third sub-group can represent students, etc.), a second set of sub-groups represents divisions of the departments (for example a sub-group representing sports includes a basketball sub-group, a baseball sub-group, etc.), and so forth. For a group including one or more sub-groups, the group is referred to as a "parent group," and the sub-groups are referred to as "child groups." A child group is a parent group for sub-groups included in the child group. In one embodiment, when groups are organized hierarchically, a user may be required to be a member of a parent group before the user may join a child group of the parent group.

Groups are represented in the social graph by a node. A node representing a user that is a member of a group is connected to the node representing the group by an edge representing the association of user with the group. Additional edges between a node representing a user and a node representing a group may be established to identify interactions between the user and the group. For example, the node associated with a user is connected to the node representing a group by an edge representing a communication to the group from the group member, and any number of additional edges representing other interactions between the group member and the group may be added. The group node may also be connected to a node representing the group's subject matter.

FIG. 1 is a high-level block diagram illustrating the recommendation of groups for a social networking system user to join, to create, or to add other users, in accordance with an embodiment of the invention. The example of FIG. 1 shows a target user 105 interacting with a social networking system 100. The social networking system 100 includes a user interface 110, a group recommendation engine 120, and storage 160 including a social graph storage module 165 and a group storage module 170. Data from the target user 105 is received by the social networking system 100 via the user interface 110, which also presents the target user 105 with one or more group-related recommendations from the group recommendation engine 120.

The group recommendation engine 120 recommends one or more groups for the target user 105 to join based on information about the target user and other users stored in the social graph store 165 and/or information associated with one or more candidate groups stored in the group store 170. In various embodiments, the group recommendation engine 120 may use any additional information when recommending groups to the target user 105. The target user 105 may be prompted to join a recommended group via the user interface 110. Alternatively, the group recommendation engine 120 automatically adds the target user to a recommended group and notifies the user of its addition to the recommended group.

In addition to recommending existing groups for the target user 105 to join, the group recommendation engine 120 may also recommend a new group for the target user 105 to create. Information in the social graph store 165 associated with the target user, associated with users connected to the target user 105, and/or any other suitable information in the social graph store 165 may be used to recommend a group for the target user 105 to create. For example, from information in the social graph store 165, the group recommendation engine 120 determines the target user 105 is a Berkeley alumni, the target user 105 is a fan of the rock group Poison, and that the target user 105 is connected to several additional users that are Berkeley alumni and are fans of Poison. Hence, the group recommendation 120 engine may recommend that the target user 105 create a "Berkeley alumni Poison fan club" group. Further, the group recommendation engine 120 may recommend one or more groups for the target user 105 to join or to create based on answers received from the target user 105 in response to a set of questions.

Additionally, the group recommendation engine 120 may recommend one or more users for the target user 105 to add to one or more groups. The groups may be a group including the target user 105 as a member, or a group otherwise associated with the target user 105 or associated with an identified user connected to the target user 105. Data in the social graph store 165, data in the group store 170, or any other information in the social networking system 100 associated with the target user 105 or with users connected to the target user 105 may be used to recommend users for addition to a group associated with the target user 105. Operation of the group selection module 120 is further described below in conjunction with FIGS. 2-6.

Figure 2:
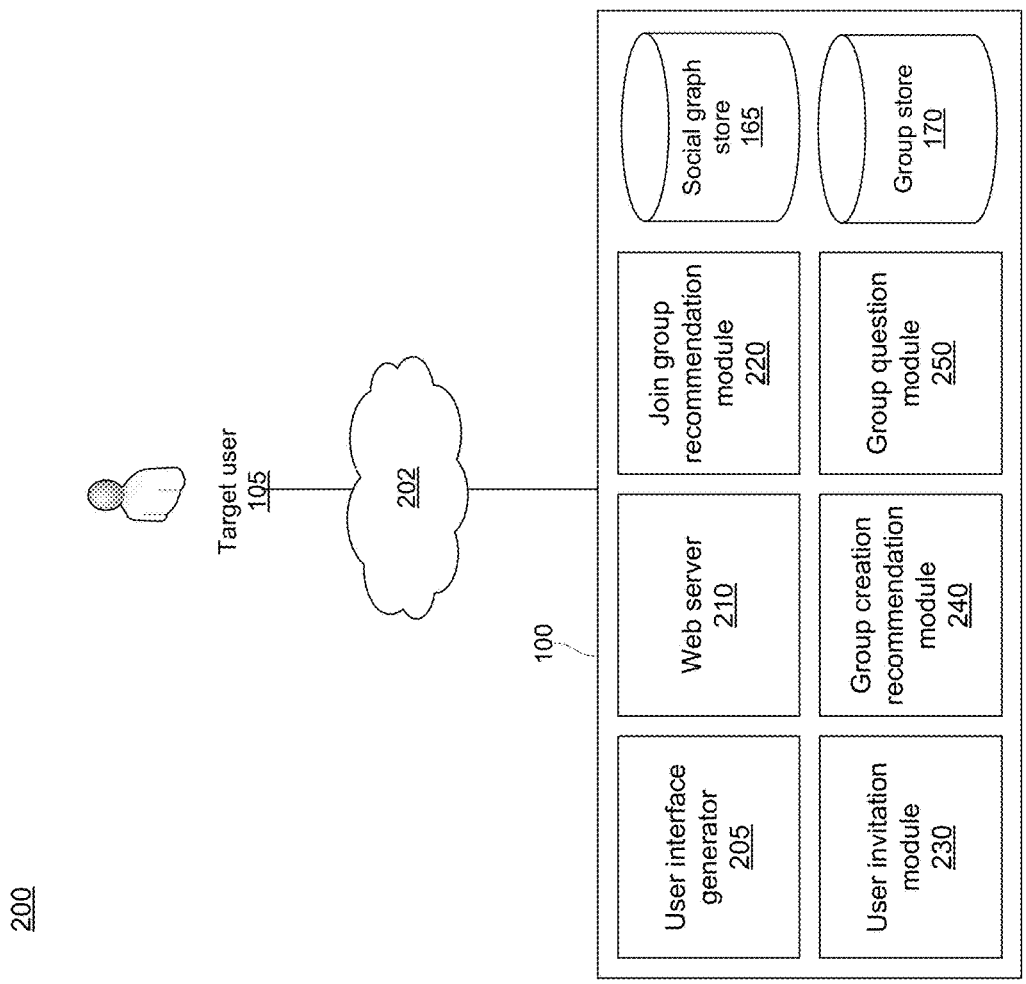
FIG. 2 is a network diagram of a system environment for recommending groups to a user, in accordance with an embodiment of the invention.

FIG. 2 is a network diagram of a system environment 200 for recommending actions associated with groups to a user, in accordance with an embodiment of the invention. The system environment 200 includes a target user 105 communicatively coupled to a social networking system 100 via a network 202. The target user 105 is associated with a client device (e.g., a smart phone, a laptop computer, a desktop computer, etc.), which receives input from the target user 105 and communicates the data to social networking system 100 via the network 202. The client device also receives data from the social networking system 100 via the network 202 and presents the data to the target user 105. The network 202 may be a local area network, a wide area network, or any other network or combination of networks that allows communication between devices. The connecting network may use standard communications technologies and/or protocols and may include wireless and/or wired communication protocols. In other embodiments, the system environment 200 includes additional components not illustrated herein.

The social networking system 100 includes a user interface generator 205, a web server 210, a join group recommendation module 220, a user invitation module 230, a group creation recommendation module 240, and a group question module 250. In one embodiment, the group recommendation module of FIG. 1 includes the join group recommendation module 220, the user invitation module 230, the group creation recommendation module 240, and the group question module 250. The social networking system 100 also includes the social graph store 165 and the group store 170 shown in FIG. 1. In other embodiments, the social networking system 100 includes additional, fewer, or different components than those illustrated herein.

The target user 105 communicates with the social networking system 100 via the network 202. As described above, the target user 105 users a client device to communicate with the social networking system 200. Examples of client devices include a mobile phone, laptop computer, desktop computer, netbook, tablet computer, cable box, or another similar device. An application running on a client device, such as a web browser or native application, communicates data between the client device and the social networking system 100 and allows the target user 105 to interact with content stored by the social networking system 100. For example, an application operating on a client device allows the target user 105 to browse content, post and send communications, establish connections with other users, join groups, create groups, invite other users to join groups, answer questions, or perform other interactions with content on the social networking system 100.

The web server 210 manages receiving and transmitting communications to and from the social networking system 100 via the network 202, and formats communications based on requirements or specifications of the network 202, client devices and/or user preferences. The web server 210 receives data from components of the social networking system 100 describing content and formatting of pages including information stored and/or maintained by the social networking system 100. In one embodiment, the web server 210 receives a user interface generated by the user interface generator 205 and communicates instructions for generating the user interface to a client device of the target user 105 for presentation. The web server 210 also receives data from the target user 105 via the user interface and directs the received data to components within the social networking system 100.

The user interface generator 205 generates instructions and/or data for presenting a user interface to social networking system users. Through the user interface, social networking system users exchange data with the social networking system 100 and otherwise interact with the social networking system 100. For example, the user interface generator 205 produces instructions that, when executed by a client device, produce a graphical user interface allowing users to navigate content stored by the social networking system 100. The user interface generator 205 may generate forms and/or pages for a user to enter biographic or geographic information, to establish connections with other users, to upload content, to join groups, to invite other users to groups, to create groups, to answer questions, and the like. Other components of the social networking system 100, such as the join group recommendation module 220, the user invitation module 230, the group creation recommendation module 240, and the group question module 250, communicate with the user interface module 205 to present group-related recommendations to the target user 105 in a user interface, which also allows the target user 105 to interact with the presented recommendations. In one embodiment, a generated user interface has a portion dedicated to group-related recommendations. Alternatively, the user interface generator 205 generates a page including group-related recommendations.

Recommendations to the target user 105 relating to a group, which are further described below, may be generated in response to a request for a recommendation from the target user 105, in response to actions performed by the target user 105, or may be automatically generated. For example, the target user 105 interacts with portions of a user interface to request a group-related recommendation. As another example, recommendations of additional users to join a group or questions for identifying additional groups are presented to the target user 105 in response to a target user 105 joining the group.

Recommending a Group to Join

The join group recommendation module 220 recommends one or more groups identified from the group store 170 for the target user 105 to join. The recommended one or more groups are determined based on characteristics of users connected with the target user 105, characteristics of groups in the group store 170, characteristics of the target user 105, and/or other information stored by the social networking system 100. To recommend a group, the join group recommendation module 220 identifies a set of one or more users connected to the target user 105 from the social graph store 165. In one embodiment, the set of users includes one or more users that have explicitly established a connection with the target user 105. In an alternative embodiment, the set of users includes one or more users sharing a common characteristic with the target user 105. Examples of common characteristics between the target user 105 and users in the set of users include biographic characteristics, geographic characteristics, demographic characteristics, interests, political views, religious views, one or more common social networking system groups, and the like.

The join group recommendation module 220 retrieves an affinity between the target user 105 and each of the users in the set of users from the social graph store 165. In one embodiment, an affinity between the target user 105 and a user is represented by a coefficient that represents the strength of the connection between the user and the target user 105. Affinities between users are further described above. Based on the identified set of users, the join group recommendation module 220 identifies a set of candidate groups. In one embodiment, the join group recommendation module 220 accesses the social graph store 165 to identify groups having at least a threshold number of users in the set of users as members. The threshold number of users allows the join group recommendation module 220 to modify the number of candidate groups so that each candidate group includes a minimum number of members from the set of users. In one embodiment, for each combination of candidate group and user from the set of users, the join group recommendation module 220 determines a level of activity of the user with the candidate group. The level of activity indicates a frequency/and or amount of interaction between the user and the candidate group. For example, the level of activity is a coefficient associated with an identified user that is based on interactions between the identified user and a candidate group, interactions between the identified user and other members of the candidate group, and/or other similar interactions. In one embodiment, the value of the coefficient is proportional to the frequency and/or amount of an identified user's interactions with a candidate group, so a lower coefficient indicates fewer interactions and vice versa.

Alternatively, a set of candidate groups is identified by the group recommendation module 220 before identifying a set of users connected to the target user 105. In such an embodiment, a set of candidate groups sharing one or more common characteristics with the target user are retrieved from the group store 170. For example, if the target user 105 lists the movie "Shawshank Redemption" as a favorite movie in a user profile, the group storage module 170 is accessed to identify groups associated with the movie "Shawshank Redemption," which are used as the set of candidate groups. After identifying the set of candidate groups, users that are members of at least one candidate group are identified from the group store 170 or from the social graph store 165. The social graph store 165 is accessed to identify which of the identified users are connected to the target user 105.

The join group recommendation module 220 selects one or more candidate groups based on various factors. Examples of factors include: characteristics of the target user 105, characteristics of the set of users connected to the target user 105, and/or the characteristics of the set of candidate groups. In one embodiment, a candidate score is computed for each candidate group, and the one or more candidate groups with the highest candidate scores are selected for recommendation. A candidate score for a candidate group is based on one or more of: the affinity of the target user 105 for the candidate group, affinities of the target user 105 for each user in the candidate group, and the level of activity of users in the candidate group. For example, a candidate score for a candidate group is determined by combining a product of a user's level of activity within the candidate group and the affinity between the target user 105 and the user in the candidate group, for each user in the candidate group that is connected to the target user 105. For example, candidate group XYZ includes three users (User A, User B, User C) connected to the target user 105 are members of candidate group XYZ, with the following coefficients for the three users:

User A—Target User Affinity: 0.5
User A—Group XYZ Activity: 0.4
User B—Target User Affinity: 0.7
User B—Group XYZ Activity: 0.9
User C—Target User Affinity: 0.2
User C—Group XYZ Activity: 1.5

In this example, the coefficient between User A and the target user 105 representing affinity between User A and the target user 105 is 0.5, the coefficient representing the level of activity of User A with Group XYZ is 0.4, and so forth. A candidate score for Group XYZ may be computed by summing the products of the pair of coefficients for each user. For example, the coefficient representing the affinity of User A and the target user 105 and the coefficient representing the level of activity of User A with Group XYZ are multiplied, the coefficient representing the affinity between User B and the target user 105 is multiplied by the coefficient representing the level of activity of User B with Group XYZ, and the coefficient representing the affinity between User C and the target user 105 is multiplied by the coefficient representing the level of activity of User C with Group XYZ, and the resulting products are summed. In this example, the candidate score for Group XYZ is: 0.5*0.4+0.7*0.9+0.2*1.5=1.13.

Candidate scores may be determined in other ways. In one embodiment, candidate scores may be determined without considering the level of activity of users connected to the target user 105 within candidate groups. For example, a candidate score comprises the sum of affinities between members of the candidate group connected to the target user 105 and the target user 105. In this embodiment, candidate groups including members having high affinities with the target user 105 have higher candidate scores. Alternatively, a candidate score may be determined based on the number of members in the candidate group that are connected to the target user 105.

Candidate scores can be based on a user's affinity for concepts, interests, or subject matter associated with the group. In one embodiment, a candidate score can be based on a user's affinity towards one or more nodes to which the candidate group are explicitly connected. The explicit connection between groups and nodes representing concepts, interests, or subject matter are further described in U.S. patent application Ser. No. 13/239,340, titled "Structured Objects and Actions on a Social Networking System," filed on Sep. 21, 2011, the contents of which are incorporated herein by reference in their entirety. In one embodiment, a candidate score can be based on a connection between an inferred group topic and a concept, interest, or subject matter, using for instance natural language and/or keyword comparisons. Inferred topics (described herein as "dark tagging") are further described in U.S. application Ser. No. 12/589,693, titled "Providing Content Using Inferred Topics Extracted from Communications in a Social Networking System," filed Aug. 20, 2012, the contents of which are incorporated herein by reference in their entirety. Candidate scores can also be based on a user's search queries, based on social graph nodes associated with such search queries, based on structured data and keywords associated with user communications and interactions, based on ads with which a user interacts, or based on any other factor associated with the use of the social networking system 100 by a user.

In some embodiments, candidate scores are modified based on characteristics of the target user 105, characteristics of the users connected to the target user 105, and/or characteristics of the candidate groups. For example, candidate scores may be weighted based on candidate group type. For instance, closed groups (groups requiring an invitation or explicit approval by a group manager) may be associated with lower coefficients relative to open groups (groups that anyone can join); hence, candidate scores associated with open groups may be adjusted upwards relative to candidate scores associated with closed groups, and vice versa. As another example, candidate scores may be weighted based on the number of members of each candidate group. In one embodiment, candidate scores associated with large groups are weighted upward relative to candidate scores associated with small groups. Candidate scores can be weighted based on the level of activity within each candidate group. For example, candidate scores associated with candidate groups having members that frequently interact with the candidate group (e.g., members that communicate with other members, post messages to a group wall, share content within the group, etc.) can be weighted upward relative to candidate scores for candidate groups with less-active members.

Additionally, characteristics common to candidate groups and the target user 105 may be used to weight candidate scores. For example, common geographic information, biographic information, demographic information, or any other characteristic between a candidate group and the target user 105 may be used to modify the candidate group's candidate score. For example, candidate scores for candidate groups associated with a location matching the current location of the target user 105 or matching a location identified as the target user's hometown may be increased. A candidate group's candidate score may be weighted based on common characteristics between the target user 105 and members of the candidate group connected to the target user. For example, if several members of a candidate group connected to the target user list a common school, the candidate group's candidate score may be increased relative to other candidate scores.

Figure 3:
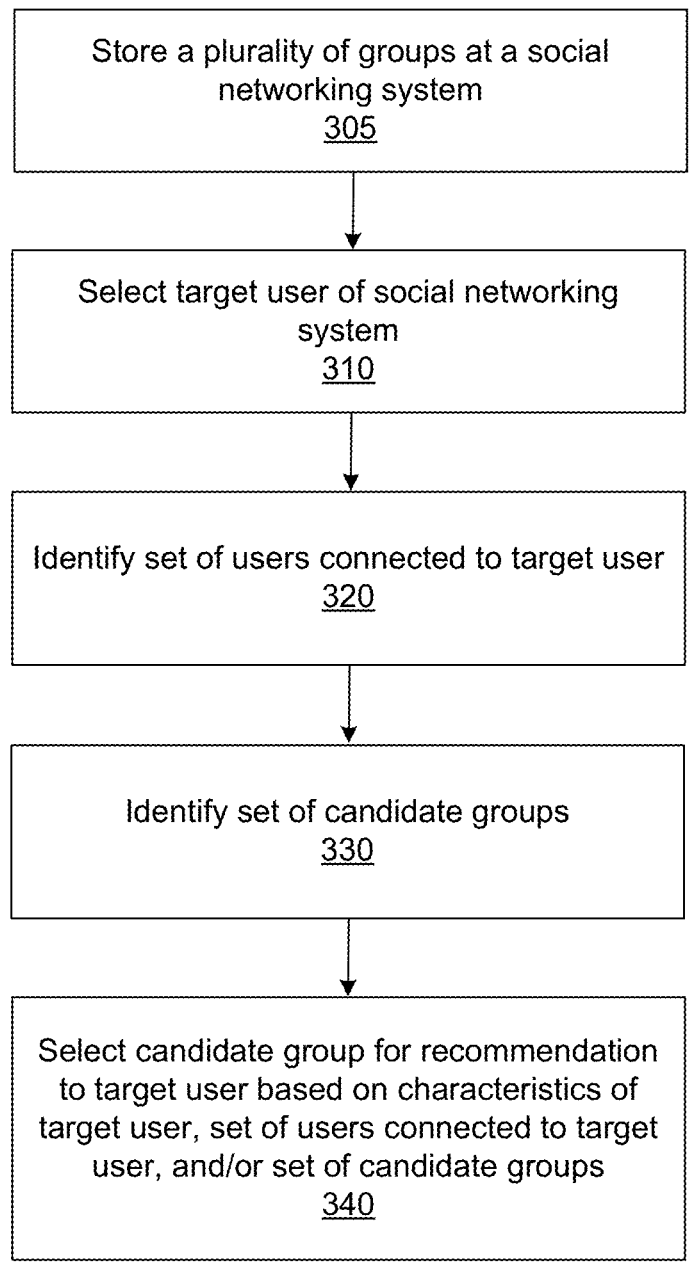
FIG. 3 is a flowchart of a process for recommending a group for a social networking system user to join, in accordance with an embodiment of the invention.

One or more candidate groups selected for recommendation to the target user 105 are presented to the target user 105 via the user interface 110. The target user 105 may choose to join a selected candidate group or may choose not to join a candidate group by interacting with the user interface. Alternatively, the target user may be automatically added to a selected group, or may be automatically requested to join a recommended group that is closed FIG. 3 is a flowchart of one embodiment of a process 300 for recommending a group for a target user to join. As described above, a plurality of groups are stored 305 by the social networking system 100, and a target user is selected 310. The target user may explicitly request a recommendation of a group to join or may be any user of the social networking system 100.

The group join recommendation module 220 of the social networking system 100 identifies 320 a set of users connected to the target user and identifies 330 a set of candidate groups. In one embodiment, the identified set of candidate groups having at least one member that is connected to the target user or that has at least one common characteristic with the target user. In an alternative embodiment, the set of candidate groups is identified 330 and the set of candidate users is identified 320 based on the set of candidate groups. For example, the set of candidate groups is identified 330 and users included in at least one candidate group and also connected to the target user or having at least one characteristic in common with the target user are identified 320.

Based on characteristics of the target user, characteristics of the set of users connected to the target user and/or characteristics of the set of candidate groups, one or more candidate groups are selected 340. In one embodiment a candidate score is determined for each candidate group based on the affinities between the target user and users in a candidate group connected to the target user and the level of activity of users in the candidate group that are connected to the target user. Characteristics of a candidate group may be used to modify a candidate group's candidate score. Examples of group characteristics modifying a candidate score include: whether a candidate group is open or closed, the number of candidate group members, common characteristics between a candidate group and the target user, common characteristics between the target user and candidate group members, and so forth. The candidate scores are used to select 340 a candidate group. For example, the candidate group with the highest candidate score is selected 340 or candidate groups having a candidate scores of at least a threshold are selected 340. The selected candidate group or groups are presented to the target user via a user interface. Alternatively, the target user is automatically added to a selected candidate group. For example, the target user's user profile may permit the social networking system 100 to automatically add the target user to recommended groups.

As an example of the process of FIG. 3, a user requesting a recommendation of potential groups to join is selected as the target user. In this example, the friends of the target user within the context of the social networking system are identified as the set of users connected to the target user, and the groups to which at least a threshold number of friends belong are identified as the set of candidate groups. For instance, if over a threshold number of friends belong to a "Stanford University" group, it is added to the set of candidate groups. Similarly, if less than a threshold number of friends belong to a "Duke University" group, it is not added to the set of candidate groups. Continuing with this example, a candidate score is determined for each group in the set of candidate groups. The candidate score for each group is based on how active each friend is in each candidate group (for instance, an average of a measure of activity across all friends), and based on the affinity between each friend and the target user. In this example, the candidate group associated with the highest candidate score is selected, and the target user is presented with the option of joining the selected candidate group.

Recommending Users to Invite to a Group

In addition to recommending a group for a target user to join, the social networking system 100 may aid members of a group in inviting additional users to join the group. For example, a user creating a target group or administering a target group may seek to add additional users to the target group. To more easily identify users to add to the target group, the user invitation module 230 identifies a set of candidate users for a user in the target group to invite to the target group. Based on characteristics of the user in the target group, characteristics of the candidate users and/or characteristics of the target group, the user invitation module 230 selects one or more of the candidate users for recommendation.

A user in the target group may explicitly request recommendations for users to add to the target group via a user interface or may receive recommendations from the user invitation module 230 responsive to performing an action within the social networking system 100. For example, the user joining the target group causes the user invitation module 230 to recommend additional users for the user to invite to the target group. Similarly, a user in the target group may interact with an object in the social networking system 100, such as a group page associated with the target group, and the user invitation module 230 provides user recommendations responsive to the interaction. Other example actions include becoming friends with another user, "liking" a social networking system object, following a social networking system page, interacting with social networking system content offsite, and the like. Alternatively, the social networking system 100 includes a user interface configured to request and display recommendations users to join a group based on input from a user in the group.

The user invitation module 230 identifies the target group based on the user requesting a recommendation. For example, based on a request for a recommendation from a user or an action by a user, the user invitation module 230 identifies the target group. Generally, the target group is a group having the user as a member, although the target group may be a group with which the user is not a member but is instead merely associated or affiliated with. For example, a user may attend The University of Miami but not be a member of the Miami Hurricanes football team fan group; however, because the user and the Miami Hurricanes football team fan group include a common characteristic of "The University of Miami," the user invitation module 230 may use the Miami Hurricanes football team fan group as the target group for recommending additional users to the user attending the University of Miami.

Any group having a user requesting a recommendation (a "requesting user") as a member, or otherwise associated with the requesting user, may be a target group for recommending additional users to the requesting user. For example, the user invitation module 230 may select the target group as the group that the target user most recently joined or may select the target group as the group associated with the most recent action by the requesting user. As additional examples, the user invitation module 230 selects the target group as the smallest or the largest group to which the requesting user is a member, or selects the target as the group having the most average activity among members. The target group may be a group that the requesting user created or manages. Any other suitable criteria may be used to select a target group. However, the requesting user may specify the target group when requesting a recommendation for additional users to join the target group.

The user invitation module 230 identifies a set of candidate users associated with the requesting user. Recommendations for users to join the target group are made from the set of candidate users. In one embodiment, the set of candidate users is all users that are explicitly connected to the requesting user. In another embodiment, the set of candidate users is a subset of users that connected to the requesting user and satisfying one or more criteria (e.g., family members, friends, or co-workers of the target user; users with common interests, common geographic information, common biographic information, common demographic information, or any other common characteristic with the requesting user). The set of candidate users may include users that are not connected to the requesting user, but have common characteristics with the requesting user, such as common geographic, demographic, or biographic information, common friends, common groups, and the like. In one embodiment, candidate users are identified as described in U.S. application Ser. No. 12/857,533, titled "Suggesting Connections to a User Based on an Expected Value of the Suggestion to the Social Networking System," filed Aug. 16, 2010, the contents of which are incorporated herein by reference in their entirety.

One or more users from the set of candidate users are selected for recommendation to the requesting user based on one or more criteria. Example criteria include: characteristics of the requesting user, characteristics of the target group, and characteristics of each user in the set of candidate users. Such characteristics include geographic characteristics (such as a current or previous location, hometown, location check-in, location visited, and the like), a biographic characteristics (e.g., workplace, school, class year, career, major, class taken, sport participated in, age, gender, ethnicity, and the like), hobbies or interests (e.g., a favorite sport or team, activity, celebrity, movie, actor, band, music genre, book, author, video game, board game, artist, and the like), political or religious views, philosophies, connected users (e.g., family, spouse, parent-child, sibling, co-workers, classmates, church members, friends, and the like), or any other characteristic suitable for use in selecting users for recommendation. Characteristics of the requesting user, the target group, and the users in the set of candidate users are retrieved from the social graph store 165 and from the group store 170.

The user invitation module 230 can select one or more candidate users using a variety of criteria. For example, a candidate user is selected based on the number of users connected to both the candidate user and the requesting user. As an example, if three candidate users are to be selected for recommendation, the user invitation module 230 may select the three candidate users connected to the most common users as the requesting user. As another example, the user invitation module 230 selects the candidate user with the highest number of members of the target group connected to the candidate user. Alternatively, a combination of these two factors may be used to select a candidate user. In one embodiment, a candidate user connected to the most common users with the requesting user that are also members of the target group is selected.

In another embodiment, the user invitation module 230 determines a user score for each candidate user and selects one or more candidate users based on the user scores. For example, the user invitation module 230 selects one or more candidate users with the highest user scores. As another example, the user invitation module 230 selects one or more candidate users with user scores equaling or exceeding a threshold value. The user scores may be based on a combination of one or more factors and the factors may also be weighted according to their importance or relevance.

One factor for calculating the user scores may be the number of common users connected to a candidate user and to the requesting user. For example, a user score for a first candidate user connected to 10 users also connected to the requesting user may be higher than a user score for a second candidate user connected to 2 users also connected to the requesting user. Another factor for calculating user scores may be the number of users that are members of the target group to which each candidate user is connected. For example, a user score for a first candidate user connected to 6 users that are members of the target group is higher than a user score for a second candidate user connected to 3 users that are members of the target group.

User scores may also be based on the affinities between the candidate users and the requesting user. For example, a user score for a candidate user that is the spouse of the requesting user may be higher than the user score for a candidate user that is a co-worker of the requesting user. The user scores may be based on common characteristics between the requesting user and the candidate users. For example, user scores may be proportional to the number or percentage of common biographical, demographical, or geographic information between each candidate user and the requesting user, the number or percentage of common interests, and the like. Similarly, user scores may be based on actions between candidate users and the requesting user. For example, a user score for a candidate user that communicates regularly with the requesting user may be higher than a user score for a candidate user that does not often interact with the target user.

In some embodiments, user scores may be based on common characteristics between candidate users and the target group. For example, if a target group is associated with particular subject matter, user scores for candidate users associated with the subject matter may be higher than user scores for candidate users not associated with the subject matter. As an example, if a target group is associated with the state of Minnesota, user scores for users listing Minnesota as a hometown, as a current city or previous city, as an interest, and the like, may be higher than candidate scores for users not associated with Minnesota. As an additional example, for a target group associated with the San Francisco Giants, candidate users identifying the Giants as a favorite team, listing baseball as an interest, checking into the Giants' baseball stadium, or performing other actions associated with the Giants may have higher user scores than candidate users not associated with the Giants. User scores may also be based on common characteristics between candidate users and other members of the target group. For example, a user score for a candidate user that attended the same school or that worked for the same employer as several members of the target group is higher than the user score for a candidate user without characteristics in common with members of the target group.

One or more candidate users selected for recommending to the requesting user are displayed to the requesting user. The number of candidate users selected may be predetermined, may be based on a context of the requesting user within the social networking system 100, or may be based on interface constraints of the social networking system 100. For example, if the requesting user accesses a social networking system interface used to recommend users to add to a target group, the number of candidate users selected may be based on the amount of display space available in the interface. In one embodiment, additional candidate users may be selected in response to the recommending user selecting a presented user for addition to the target group. Selected candidate users may be displayed in any suitable manner. For example, one or more of names, images, or other information associated with selected candidate users are presented. Additional information may be presented along with the selected candidate users, such as one or more inputs for adding a candidate user to the group, such as an "add user" link, or the like.

If the recommending user selects a presented candidate user to add to the target group, the selected candidate user is added to the target group. The selected candidate user may subsequently elect to be removed from the target group. In one embodiment, after electing to be removed from the target group, the selected candidate user is excluded from future consideration as a candidate user for the target group. Alternatively, subsequently computed user scores for the selected candidate user electing to be removed from the target group may be reduced to decrease the likelihood of the selected candidate user again being recommended to join the target group. Alternatively, if the recommending user selects a presented candidate user, the selected candidate user may be invited to the target group or may be added to the target group pending the selected candidate user's approval of the addition to the target group.

It should be noted that the principles described herein apply equally to circumstances in which a target group has not yet been created. For example, candidate users can be identified and recommended to a recommending user as described above when the recommending user is creating a group. In this example, the recommended candidate users can be presented to the recommending user as potential users to add to the group that the recommending user is creating.

Figure 4:
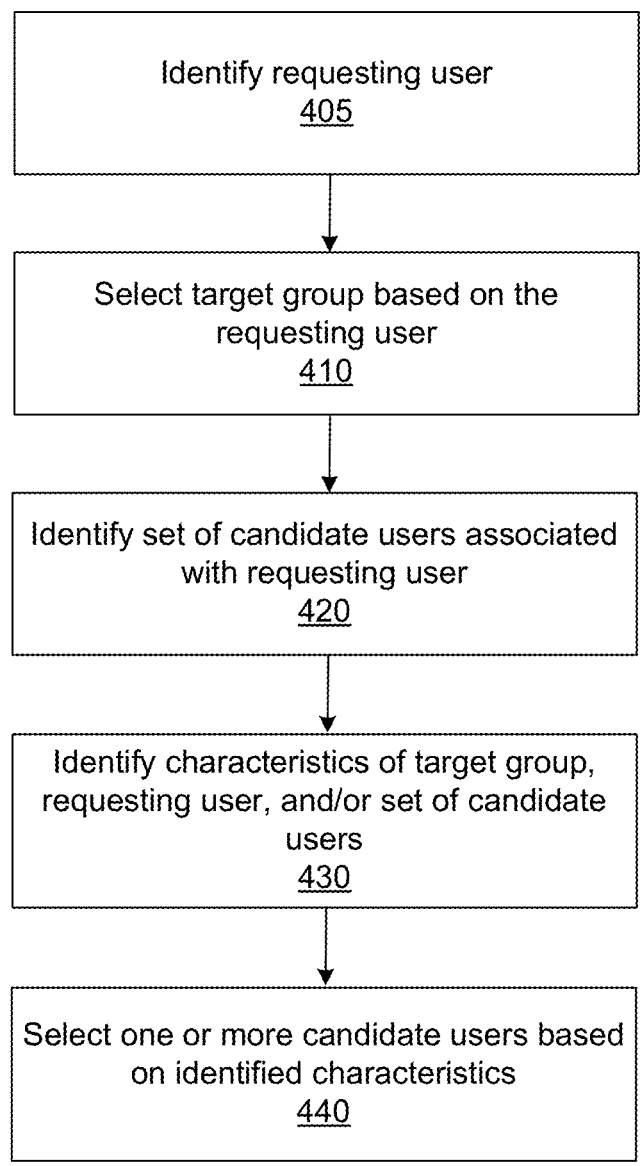
FIG. 4 is a flowchart of a process for selecting a user to recommend to add to a group in a social networking system, in accordance with an embodiment of the invention.

FIG. 4 is a flowchart of one embodiment of a process 400 for selecting a user to recommend adding to a group in a social networking system. A requesting user is identified 405. The requesting user may be a user that explicitly requests recommendations for users to add to a target group, or may be a user performing an action in the social networking system 100 that triggers a request for recommendations of users to add to the target group. In one embodiment, the target group is selected 410 based characteristics of the requesting user or based on one or more inputs received from the requesting user. For example, the target group may be a group having the requesting user as a member, may be the group most recently joined by the requesting user, may be the group most recently interacted with by the requesting user, may be the group having the largest number of members and that includes the target user, or may be selected 410 using any other suitable criteria.

A set of candidate users associated with the requested user is identified 420. In one embodiment, the set of candidate users includes users connected to the requesting user. The set of candidate users may include users connected to the requesting user and sharing one or more common characteristics with the requesting user, or may include users having specified types of connections to the requesting user. In some embodiments, the set of candidate users includes users having common characteristics with the requesting user but that are not connected to the requesting user. One or more characteristics of the target group, the requesting user, and/or the set of candidate users are identified 430. Examples of characteristics of candidate users and/or the requesting user include biographic, demographic, or geographic information, interests, connections to additional users, groups including the user, and the like. Example characteristics of the target group include the group's subject matter, group members, and the like.

Based on the identified characteristics, one or more candidate users are selected 440 for recommendation to the requesting user. In one embodiment, the candidate users are selected 440 based on the number of common users connected to each candidate user and to the requesting user and/or based on the number of users connected to each candidate user that are members of the target group. In one embodiment, a user score is computed for each candidate user based on one or more of: the characteristics of the candidate users, the characteristics of the target user, and/or the characteristics of the target group. Based on the user scores, one or more candidate users are selected 440, as described above in conjunction with FIG. 2.

Selected candidate users are presented to the requesting user. For example, the selected candidate users are displayed by a social networking system interface, for instance within a social networking system or external to the social networking system (using a social networking system plug-in or similar technology). The requesting user may select one or more of the presented candidate users to add to the target group, and the selected presented candidate users are automatically be added to the target group. Alternatively, the selected presented candidate users are invited to the target group and added to the target group if they accept the invitation.

Recommending a Group to Create

The social networking system 100 may also assist a user in creating a new group by recommending groups to create based on common characteristics between users. The group creation recommendation module 240 identifies a common characteristic between a creating user and one or more other users and recommends creating a group associated with the common characteristic. The creating user may explicitly request recommendations for group creation from the social networking system 100 by interacting with a group creation recommendation input. Recommendations for group creation may alternatively be automatically provided based on one or more actions by the creating user in the social networking system 100. In one embodiment, the creating creates a first group, which causes the group creation recommendation module 240 to recommend the creation of a second group, which may be a sub-group of the first group.

To recommend a new group to create, the group creation recommendation module 240 identifies a set of users associated with the creating user. For example, the set of users includes any users connected to the creating user, or includes users connected to the creating user by one or more specified types of connections. In one embodiment, the set of users may include users having one or more characteristic in common with the creating user but not connected to the creating user. Additional users can be added to the set of users, such as users with one or more characteristics in common with other users in the set of users but that are not necessarily connected to the creating user.

One or more common characteristics between the creating user and one or more users in the set of users are selected or identified. Any common characteristic between the creating user and at least one user in the set of users may be selected. Examples of common characteristics include: a common geographic characteristic (such as a current or previous location, hometown, location check-in, location visited, and the like), a common biographic characteristic (e.g., workplace, school, class year, career, major, class taken, sport participated in, age, gender, ethnicity, and the like), a common hobby or interest (e.g., a favorite sport or team, activity, celebrity, movie, actor, band, music genre, book, author, video game, board game, artist, and the like), a common political or religious view, a common philosophy, a common connection type (e.g., family, spouse, parent-child, sibling, co-workers, classmates, church members, friends, and the like), or any other characteristic suitable for a group's subject matter. It should be noted that characteristics of users may not be explicit, and may instead be inferred using dark tagging as described above.

In one embodiment, the creating user selects the one or more common characteristics. Alternatively, the one or more common characteristics are identified based on information associated with the creating user and users in the set of users. For example, a characteristic common to the creating user and users in the set of users having the highest affinity with the creating user. As described above, affinities between users may be represented by a coefficient associated with an edge between nodes representing the user and the creating user in the social graph store 165. In one embodiment, a characteristic common to the creating user and users in the set of users having at least a threshold affinity with the creating user is selected. For example, a characteristic common to the creating user and family members of the creating user in the set of users.

As another example, a characteristic common to the creating user and at least a threshold number of users in the set of users is selected. In some embodiments, characteristics common to the creating user and users in the set of users are prioritized and the prioritization is used to select one or more common characteristics. For example, familial relationships common to the creating user and users in the set of users may have a higher priority than a favorite movie common to the creating user and users in the set of users; in this example, the common familial relationship is selected as a common characteristic rather than the common favorite movie. Prioritization of common characteristics may be based on stored data, and the highest priority characteristic or characteristics common to the creating user and one or more users in the set of selected users may be selected.

A selected common characteristic is used as the subject matter for a group recommended by the group creation recommendation module 240 for creation by the creating user. The create group recommendation module 240 may also recommend a title for the recommended group based on the selected common characteristic. For example, if the selected common characteristic is the movie "Pulp Fiction," the title "Pulp Fiction Fans" may be recommended. As another example, if the selected common characteristics are classmates at "Post Falls High School" and a favorite sports team of the "Chicago Cubs," the title "Post Falls High School Alumni Chicago Cubs Fans" may be recommended.

The group creation recommendation module 240 may identify and present additional users for addition to the group recommended for creation. The additional users may be identified from the set of users having the selected common characteristic with the creating user. Users having the selected common characteristic with the creating user but not in the set of users may also be identified as additional users. For example, the group creation recommendation module 240 recommends the creation of a group to the creating user via a group creation interface and displays additional users to invite to the group, using the group creation interface, if the creating user creates the recommended group. Information identifying the additional users, such as user names or images, may be presented via the group creation interface. In one embodiment, one or more identified additional users are automatically added or invited to the recommended group if it is created. In this embodiment, the group creation recommendation module 240 may allow the creating user to prevent adding or inviting selected additional identified users to the group.

Group customization options may be presented to the creating user when a recommended group is created. Examples of group customization options include: changing the group title, adding or removing members to or from the group, inviting users to the group, providing descriptive information about the group, customizing group communication options, creating or modifying a group page, uploading objects (such as photos or videos) to the group, and the like. In one embodiment, one or more customization options may be automatically performed based on characteristics of the creating user and/or characteristics of users added to or invited to the group.

In one embodiment, the group creation recommendation module 240 determines whether an existing group is related to the selected one or more common characteristics before recommending the creation of a new group. For example, if the selected common characteristic is the movie "Pulp Fiction," the group creation recommendation module 240 determines if a group associated the movie "Pulp Fiction" is in the group store 170 and recommends that the creating user join an existing group if one is in the group store 170. In one embodiment, the group creation recommendation module 240 and the join group recommendation module 220 exchange data, with the join group recommendation module 220 determining whether a group associated with the selected common characteristic already exists and notifying the group creation recommendation module 240 of the determination results.

Figure 5:
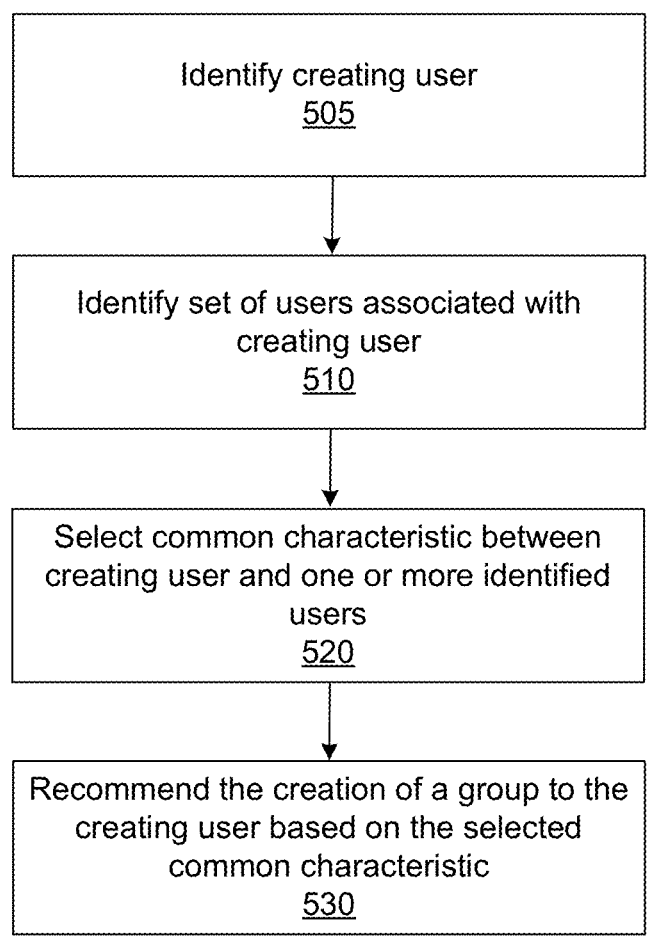
FIG. 5 is a flowchart of a process for recommending a group for a social networking system user to create, in accordance with an embodiment of the invention.

FIG. 5 is a flowchart of an embodiment of a process 500 for recommending a group creation by a social networking system user. The group creation recommendation module 240 identifies 505 the creating user based on a request for a recommendation received from the creating user or based on one or more interactions between a user and the social networking system 100.

A set of users associated with the creating user are identified 510 from the social graph store 165. For example, the set of users includes users connected to the creating user and/or includes users sharing one or more characteristics with the creating user. One or more characteristics common to the creating user and one or more of the users in the set of identified users are selected 520, as further described above. For example, the selected common characteristic may be a characteristic that is common to the most users in the set of identified users, may be a common characteristic having a highest priority, may be a characteristic common to the users in the set of identified users having the highest affinity with the creating user, or can be selected based on any other criteria.

Based on the selected common characteristic or characteristics, a group to be created is recommended 530 to the creating user. The group creation recommendation may be presented to the creating user via a create group interface. For example, a potential title for the group may be displayed along with one or more additional users sharing the selected common characteristic to add or invite to the group. In one embodiment, the additional users are identified based on their affinities to the creating user. For example, affinities between the users associated with the creating user and the creating user are determined and users associated with the creating user having the highest affinities or having affinities of at least a threshold are selected as additional users to invite to the group. The recommended group is created responsive to an input from the creating user to create the group. In one embodiment, group configuration options, as described above, may be presented to the creating user after the group is created.

Recommending a Group to Join or Create Based on Answered Questions

In some embodiments, the social networking system 100 may request information from a target user 105 and use the information to recommend a group for the target user 105 to join or to create. For example, the social networking system 100 presents the target user 105 with one or more questions and uses answers to the questions to recommend a group to join or to create. The group question module 250 includes one or more questions that are presented to a target user 105 and recommends a group to the target user based on received answers to the questions. Questions from the group question module 250 may be presented to the target user 105 responsive to an explicit request by the target user 105 for questions or based on interactions with the social networking system 100 by the target user 105. For example, the target user 105 joins a first group, causing the group question module 250 to present the target user with questions for recommending additional groups to the target user 105.

The group question module 250 may present questions using a question interface or using any suitable notification channel. For example, questions may be presented as stories within a news feed for the target user 105, as messages sent to the target user 105, as recommended actions for the target user to perform 105, or as other suitable notification techniques. Answers may be presented along with questions, allowing the target user 105 to select an answer. Alternatively, the target user 105 may enter text answers to presented questions.

Questions presented by the group question module 250 identify characteristics of the target user 105 to recommend one or more groups to the target user 105. In one embodiment, the questions are presented in a specified sequence to progressively obtain more detailed information about the target user 105. For example, questions can prompt the target user 105 to provide answers identifying biographic information associated with the target user (such as a current or former workplace or school, a class year, a major, career, sport participated in, team played on, age, gender, ethnicity, and the like), geographic information associated with the target user (such as a current or previous location, hometown, location checked-in to, location visited, and the like), a hobby or interest (such as a favorite sport or team, activity, celebrity, movie, actor, band, music genre, book, author, video game, board game, artist, and the like) or any other characteristic.

The questions presented to the target user 105 may be based at least in part on the context of the target user within the social networking system 100. In one embodiment, if the target user 105 joins a first group, questions presented to the target user 105 are related to the subject matter of the first group. For example, if a target user 105 joins a group associated with the "University of Washington," the group question module 250 provides questions associated with attending a university, such as "What class year are you?" or "What major are you?". If the context of the target user 105 within the social networking system 100 is more generic (e.g., the target user 105 is not a member of a group), the group question module 250 presents questions related to characteristics of the target user 105, such as information in a user profile of the target user 105, information related to characteristics of users connected to the target user 105, or other suitable characteristics associated with the target user 105.

The group question module 250 may present the target user 105 with a series of questions, where successive questions are related to previously asked questions. In one embodiment, questions presented to the target user 105 become more specific in scope, allowing the group question module 105 to identify a particular characteristic. For example, if a target user 105 joins a group related to baseball, a first question may prompt the target user 105 to identify a favorite Major League Baseball team and a second question may prompt the target user 105 to identify a favorite player on the identified favorite team. The group question module 250 may recommend a group based on an answer to any question in the series of questions.

When presenting questions to the target user 105, the group question module 250 may present predetermined answers along with a question or may present an input for the target user 105 to manually specify an answer. Predetermined answers to a question may be based on commonly received answers to the question, based on characteristics associated with the target user 105, or based on any other suitable criteria. The group question module 105 may present one question at a time to the target user 105, or may present multiple questions to the target user 105 at a time.

Answers received from the target user 105 may be associated with a particular subject matter, such as people, places, things, or concepts associated with nodes in the social graph stored in the social graph store 165. If the group question module 250 provides answers along with a question, the subject matter associated with the answers may be predetermined. For answers provided by the target user 105, the group question module 250 may compare the provided answer to nodes in the social graph store 165 to determine the subject matter associated with the provided answer. For example, the group question module 250 compares keywords in the provided answer with keywords associated with social graph nodes. In one embodiment, a target user 105 may identify subject matter associated with a provided answer using a tag or other metadata.

Upon receiving one or more answers from the target user 105, the group question module 250 identifies one or more groups associated with the received answers. Subject matter associated with the received answers is used to identify groups that are associated with the same, or similar, subject matter. For example, if the target user 105 selects answers identifying "baseball" as a favorite sport and "the San Francisco Giants" as a favorite baseball team, one or more groups associated with one or more of "baseball" and "the San Francisco Giants" may be identified. As another example, if the target user 105 provides answers indicating the target user 105 goes to San Diego State University, studies Biology, is in the class of 2014, and lives in Tenochca Hall, the group question module 250 retrieves groups associated with one or more of: San Diego State University, the subject of Biology, the class of 2014, and Tenochca Hall from the social graph store 165 and/or the group store 170. In one embodiment, groups are identified by identifying group nodes connected to subject matter nodes associated with received answers from the social graph store. Groups may also be identified by identifying groups recommended to or joined by other users answering questions similarly to the target user 105.

One or more identified groups associated with the received answers are selected for recommendation to the target user 105. Various criteria may be used to select an identified group for recommending to the target user 105. Examples of criteria include: group size, group creation dates, users connected to the target user 105 that are members of the group, group characteristics, target user characteristics, or other suitable criteria. If the group question module 250 is unable to identify one or more groups associated with received answers, the group question module 250 may recommend that the target user 105 create a group based on the received answers. The group question module 250 may communicate with the group creation recommendation module 240 to recommend a group for creation, as further described above.

One or more groups recommended for the target user 105 by the group question module 205 may be displayed to the target user 105 in a social networking system interface or presented to the user by any other suitable notification channel. In one embodiment, the target user 105 interacts with the displayed groups to join a recommended group. Alternatively, the target user may be automatically added to one or more recommended groups or may be automatically invited to one or more recommended groups.

Figure 6:
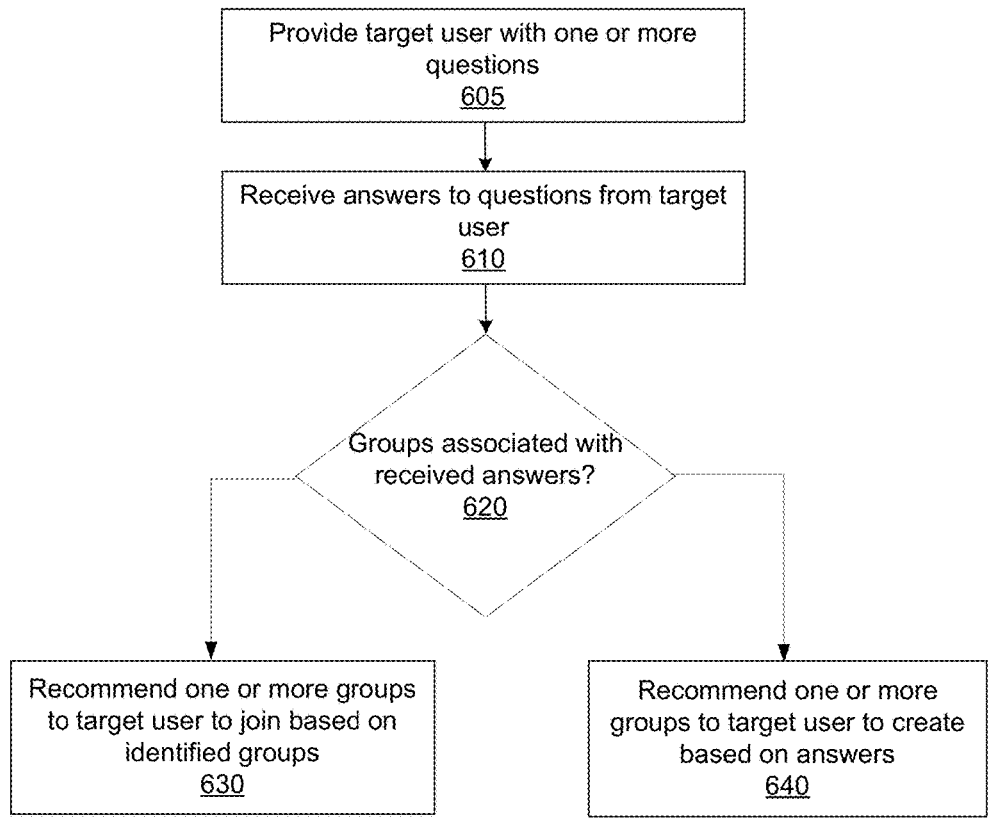
FIG. 6 is a flowchart of a process for recommending a group for a social networking system user to join based on the answers by the user to one or more questions, in accordance with an embodiment of the invention.

FIG. 6 is one embodiment of a process 600 for recommending a group for a social networking system user to join based on answers to presented questions. The group question module 250 provides 605 a target user with one or more questions. In one embodiment, the questions are provided 605 responsive to the group question module 250 receiving a request for questions from the target user. Alternatively, the questions are provided 605 in response to actions performed by the target user in the social networking system. One or more predefined answers may be presented 605 along with the questions, allowing the target user to select from the predefined answers or an input allowing the target user to manually specify an answer may be presented 605. In one embodiment, predetermined answers are each associated with particular subject matter to simplify identification of a group associated with an answer.

Characteristics of the target user are identified from the target user's answer to the presented questions. For example, answers to the questions identify geographic characteristics, biographic characteristics, demographic characteristics, hobbies, interests, or other suitable characteristics of the target user. The questions presented may be based on the context of the target user within the social networking system 100. For example, the presented questions are based on one or more of: the target user joining a group, the target user browsing a social networking system page, the target user's characteristics, the target user's membership in groups, or other suitable information associated with the target user. In one embodiment, the target user is presented 605 a series of questions that are successively more specific in scope, as described above, to identify a particular characteristic of the target user can be identified.

The group question module 250 receives 610 answers to the provided questions from the target user and identifies 620 one or more groups based on the received answers. For received answers associated with a particular subject matter, the group question module 250 determines 620 whether the group store 170 includes one or more groups associated with the particular subject matter. For answers that are not associated with subject matter (such as answers provided by the target user but not associated with subject matter by the target user), the group question module 250 compares the received answers with subject matter stored in the social networking system 100 to determine 620 if groups associated with the subject matter are included in the group store 170. In one embodiment, keywords extracted from the answers are compared to keywords associated with subject matter in the social networking system 100. After identifying subject matter associated with an answer, a group associated with the subject matter is identified using a mapping between subject matter and groups mapping, identifying groups associated with keywords matching keywords associated with the subject matter or using any other suitable method.

If one or more groups associated with the received answers are included in the group recommendation store 170, the group question module 250 recommends 630 one or more of the groups to the target user. In one embodiment, if the group question module 250 determines 620 that the group store 170 does not include a group associated with the received answers, one or more groups are recommended 640 to the target user for creation based on the received answers. Recommendations for joining or creating a group may be presented to the target user through an any suitable communication channel, as described above.

Summary

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method for recommending users to invite to a social networking system group comprising:
   receiving, at a social networking system server from a client device, a request from a user of a social networking system identifying the social networking system group maintained by the social networking system, the group including a set of users of the social networking system;
   accessing, by the social networking system, a user profile associated with the user of the social networking system, the user profile identifying one or more characteristics of the user;
   determining, by the social networking system server from the user profile, a set of candidate users connected to the user and not included in the identified group;
   determining, by the social networking system server, a user score for each of the candidate users, a user score for a candidate user based on each of one or more characteristics of the candidate user, a likelihood that the user will invite the candidate user when suggested, a likelihood that the candidate user will join the group when invited by the user, and an amount of activity of the user within the identified group;
   selecting, by the social networking system server, a candidate user associated with a user score greater than a threshold value from the set of candidate users; and
   presenting, by the social networking system server via the client device, the selected candidate user to the user within a social networking system interface displayed by the client device.

2. The method of claim 1, wherein a characteristic of the candidate user comprises one or more characteristics common to the user and the candidate user.

3. The method of claim 2, wherein selecting the candidate user from the set of candidate users further comprises:
   selecting a candidate user connected to a highest number of characteristics common to the user.

4. The method of claim 2, wherein the user score for the candidate user is proportional to a number of characteristics common to the user and the candidate user.

5. The method of claim 2, wherein the user score for the candidate user is proportional to a percentage of characteristics common to the user and the candidate user.

6. The method of claim 1, wherein a characteristic of the candidate user comprises a frequency of interaction between the candidate user and the user.

7. The method of claim 6, wherein the user score for the candidate user is proportional to the frequency of interaction between the candidate user and the user.

8. The method of claim 1, wherein the group identified by the request includes the user.

9. The method of claim 1, wherein the group identified by the request is a group the user recently joined.

10. The method of claim 1, wherein one or more characteristics of the candidate user are selected from a group consisting of: geographic information associated with the candidate user, biographic information associated with the candidate user, one or more interests of the candidate user, one or more additional users connected to the candidate user, and one or more groups including the candidate user.

11. The method of claim 1, wherein a characteristic of the candidate user comprises one or more characteristics of the candidate user associated with one or more characteristics of the group.

12. The method of claim 1, further comprising:
   receiving an input from the user identifying the selected candidate user; and
   adding the selected user to the group responsive to the input.

13. The method of claim 1, further comprising:
   adding the selected user to the group.

14. A non-transitory computer readable storage medium storing executable computer instructions that, when executed by a hardware processor, cause the hardware processor to perform steps comprising:
   receiving, at a social networking system server from a client device, a request from a user of a social networking system identifying a social networking system group maintained by the social networking system, the group including a set of users of the social networking system;
   accessing, by the social networking system, a user profile associated with the user of the social networking system, the user profile identifying one or more characteristics of the user;

determining, by the social networking system server from the user profile, a set of candidate users connected to the user and not included in the identified group;

determining, by the social networking system server, a user score for each of the candidate users, a user score for a candidate user based on each of one or more characteristics of the candidate user, a likelihood that the user will invite the candidate user when suggested, a likelihood that the candidate user will join the group when invited by the user, and an amount of activity of the user within the identified group;

selecting, by the social networking system server, a candidate user associated with a user score greater than a threshold value from the set of candidate users; and presenting, by the social networking system server via the client device, the selected candidate user to the user within a social networking system interface displayed by the client device.

15. A system for recommending users to invite to a social networking system group comprising:

a non-transitory computer readable storage medium storing executable instructions that, when executed, perform steps comprising:

receiving, at a social networking system server from a client device, a request from a user of a social networking system identifying the social networking system group maintained by the social networking system, the group including a set of users of the social networking system;

accessing, by the social networking system, a user profile associated with the user of the social networking system, the user profile identifying one or more characteristics of the user;

determining, by the social networking system server from the user profile, a set of candidate users connected to the user and not included in the identified group;

determining, by the social networking system server, a user score for each of the candidate users, a user score for a candidate user based on each of one or more characteristics of the candidate user, a likelihood that the user will invite the candidate user when suggested, a likelihood that the candidate user will join the group when invited by the user, and an amount of activity of the user within the identified group;

selecting, by the social networking system server, a candidate user associated with a user score greater than a threshold value from the set of candidate users; and presenting, by the social networking system server via the client device, the selected candidate user to the user within a social networking system interface displayed by the client device; and a hardware processor to execute the instructions.

* * * * *